United States Patent [19]
Cotter

[11] 3,732,369
[45] May 8, 1973

[54] COORDINATE DIGITIZER SYSTEM

[75] Inventor: William L. Cotter, Beverly, Mass.

[73] Assignees: Welland Investment Trust, Newton, Mass. ; a part interest; William F. Kenney, Westwood; Martin H. Reiss, Newton, Mass.

[22] Filed: Apr. 5, 1971

[21] Appl. No.: 130,969

[52] U.S. Cl. ....................................................178/18
[51] Int. Cl. ............................................G08c 21/00
[58] Field of Search.............................178/18, 19, 20

[56] References Cited

UNITED STATES PATENTS

| | | | |
|---|---|---|---|
| 3,342,935 | 9/1967 | Leifer et al. | 178/19 |
| 3,588,345 | 6/1971 | Dym | 178/18 |
| 3,567,859 | 3/1971 | Ellis | 178/18 |
| 3,440,643 | 4/1969 | Teager | 178/18 |
| 3,624,293 | 11/1971 | Baxter | 178/18 |

*Primary Examiner*—Kathleen H. Claffy
*Assistant Examiner*—Kenneth L. Richardson
*Attorney*—Wolf, Greenfield & Sacks

[57] ABSTRACT

A coordinate digitizer employs a stylus whose position on a platen is converted into digitized coordinates by utilizing the signals capacitively coupled to the stylus. The platen has a coarse grid formed by two crossed sets of parallel wires regularly spaced along the coordinate axes. The platen also has a fine grid of crossed sets of parallel wires spaced more closely along the coordinate axes than the coarse grid wires. The wires in a fine grid set are constituted by four groups of wires. To digitize the stylus position along one coordinate axis, all the wires of a group are electrically pulsed together, each group being pulsed in turn. The wires of the coarse grid are then pulsed, one at a time, in sequence. The signals detected by the stylus from the pulsing of the fine wires are used to establish a "-fine" digitized position that periodically recurs along the coordinate axis. The signals detected by the stylus from the pulsing of the coarse wires are used to establish a "coarse" digitized position that uniquely fixes the fine position on the coordinate axis. The system then scans the wire of the other coordinate axis in the same manner to digitize the position of the stylus on that axis. The system alternately scans the coordinate axes to repetitively digitize the position of the stylus with sufficient rapidity to track the movements of the stylus.

13 Claims, 25 Drawing Figures

INVENTOR
WILLIAM L. COTTER

WOLF, GREENFIELD & SACKS

INVENTOR
WILLIAM L. COTTER

WOLF, GREENFIELD & SACKS

INVENTOR
*WILLIAM L. COTTER*

*WOLF, GREENFIELD & SACKS*

INVENTOR
*WILLIAM L. COTTER*

*WOLF, GREENFIELD & SACKS*

INVENTOR
*WILLIAM L. COTTER*

*WOLF, GREENFIELD & SACKS*

INVENTOR
*WILLIAM L. COTTER*

*WOLF, GREENFIELD & SACKS*

INVENTOR
*WILLIAM L. COTTER*

*WOLF, GREENFIELD & SACKS*

COORDINATE DIGITIZER SYSTEM

FIELD OF THE INVENTION

This invention relates in general to electronic systems for ascertaining the position of a stylus on a surface and representing that position in numerical form as coordinates of the surface. More particularly, the invention pertains to electronic apparatus capable of digitizing the position of a stylus with sufficient rapidity to convert the movements of a stylus moving with the average speed encountered in manual drawing into a series of digitized coordinate positions accurately representing the track of the stylus.

DISCUSSION OF THE PRIOR ART

Electronic devices for converting the track of a stylus into numerical coordinates are, of course, known. For example, cathode ray tubes have been employed in systems which digitize the position of a "light pen" on the face plate of the tube. In such systems the "light pen" has a photosensor which emits a signal when the cathode ray beam sweeps through the pen's position. In other electronic systems, a potential field having a gradient is produced upon a surface and the position of the stylus on the surface is ascertained from the potential sensed by the stylus.

The "prior art" coordinate digitizer systems present problems where it is desired to employ a large surface area. In the case of the system which uses a potential field having a gradient, the potentials become large where the gradient must extend over a considerable surface area making high voltage insulation necessary and presenting a hazard to personnel. Further, the stylus ordinarily must be in contact with the surface so that a sheet of paper cannot be interposed between the surface and the stylus nor can anything be placed on the surface which disturbs the gradient.

In coordinate digitizer systems of the type employing a cathode ray tube, the size of the cathode ray tube places a limitation upon the area of the surface that can be digitized. Further, because the photosensor in the "light pen" must respond to the luminescent trace of the cathode ray, an opaque sheet of paper cannot be interposed between the face plate and the "light pen" without disabling the system.

Some of the conventional coordinate digitizer systems act so slowly as to be unable to follow the movements of the stylus unless the stylus is moved with deliberate slowness. In some of the conventional coordinate digitizer systems, enlargement of the surface area over which the system operates is obtained at the expense of a reduction in resolution or accuracy and in most "prior art" coordinate digitizers there is a limitation on the size of the surface area that inheres in the system.

OBJECTS OF THE INVENTION

The primary object of the invention is to provide a coordinate digitizer system having no inherent limitation on the surface area over which the system can operate and in which the enlargement of the surface area does not necessarily affect the resolution of the system.

A further object of the invention is to provide a coordinate digitizer system that can be built at moderate cost and yet provide good resolution and the speed required to follow the motion of a stylus moving with the speed customary in manual drawing.

SUMMARY OF THE INVENTION

The invention employs a platen having in it a "coarse" grid of parallel wires spaced regularly along a coordinate axis. The platen also has a "fine" grid of parallel wires which are more closely spaced along the coordinate axis than the wires in the coarse grid. The fine grid wires form four interleaved groups of wires so that the wires in each group are periodic along the coordinate axis. In the operation of the invention, all the wires of a group are electrically pulsed together. Following the pulsing of one group of wires, another group of wires is electrically pulsed, and then another, until all four groups in the fine grid have been electrically pulsed. The wires of the coarse grid are then electrically pulsed, one at a time, in sequence. A stylus, whose position on the platen is to be digitized, has an electrical conductor at its tip which capacitively couples to the wires in the grid. The signals coupled to the stylus by the pulsing of the fine grid wires are used to establish a "fine" digitized position that is periodically repeated along the coordinate axis. The signals coupled to the stylus by the pulsing of the coarse grid wires are used to establish a "coarse" digitized position that uniquely fixes the fine position on the coordinate axis. The coarse resolution arrangement and the fine resolution arrangement are locked together to insure that both arrangements remain in register. When the position of the stylus along one coordinate axis has been digitized, the system switches to coarse and fine grid wires arranged along a second coordinate axis. The wires of the second coordinate axis are then electrically pulsed in the same manner as previously described to cause signals to be capacitively coupled to the stylus. Those signals are used to digitize the position of the stylus on the second coordinate axis. The system then causes the "scan" to return to the wires of the first coordinate axis and the operation is rapidly repeated. To obviate the necessity for each scan of the coarse grid to commence at the beginning of the grid, the system is arranged, when switching the scan from one coordinate axis to the other, to commence the scan at a point close to the last digitized position of the stylus but sufficiently far removed so that the stylus does not move beyond that point during the time the other coordinate axis is being scanned. Upon recommencing the scan along the coordinate axis, the scan of the coarse grid proceeds until the position of the stylus on that axis is ascertained by the emission of signals from the stylus.

THE DRAWINGS

The invention, both as to its arrangement and mode of operation, can be more fully understood from the exposition which follows when it is considered in conjunction with the accompanying drawings in which FIG. 1 shows a platen of the type employed in the preferred embodiment of the invention;

FIG. 2 primarily shows the cross-section of a portion of the platen and illustrates the disposition of electrical conductors in the coarse grid;

Figure 5:
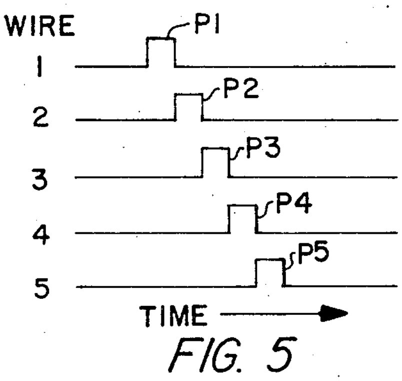
FIG. 5 depicts the sequence of scan pulses applied to a set of conductors in the platen.
Figures 9, 10:
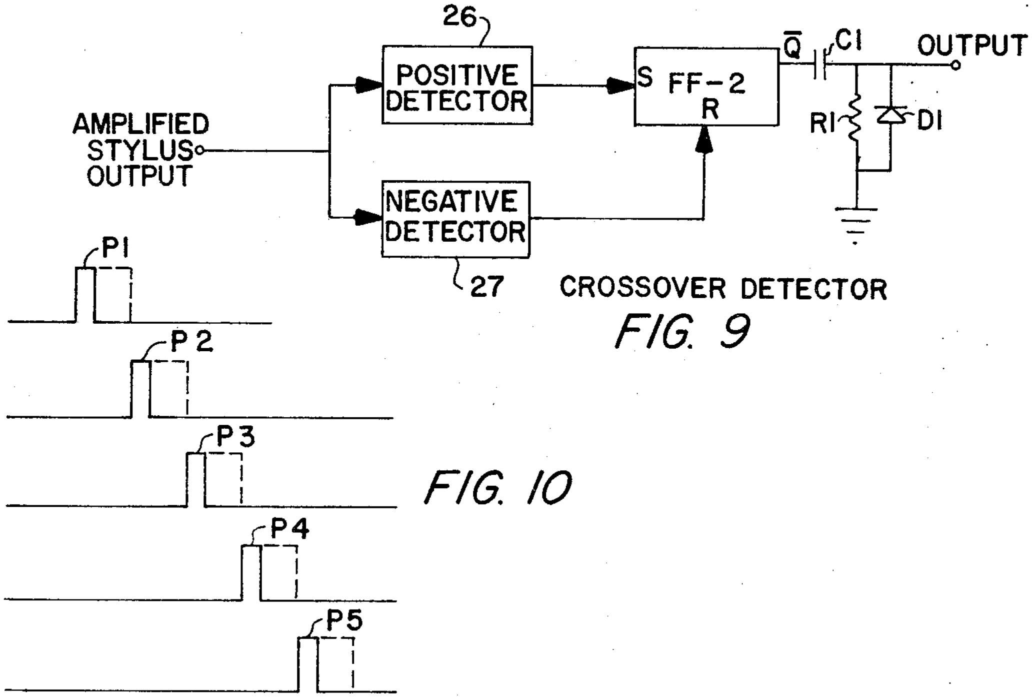
Figure 11:
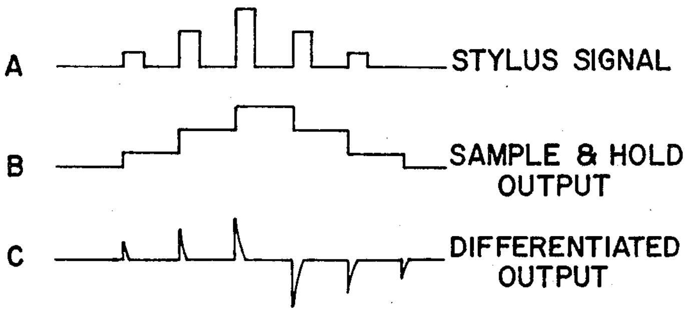
Figure 12:
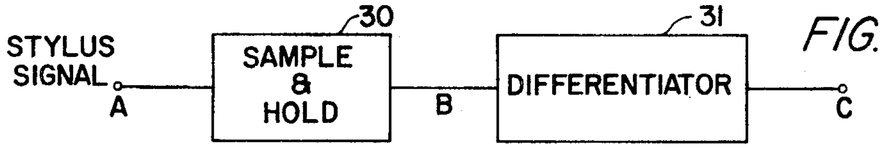
Figure 13:
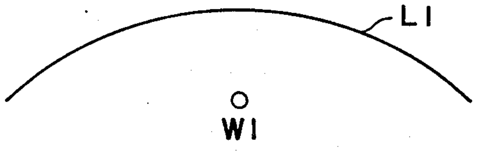
Figure 14:
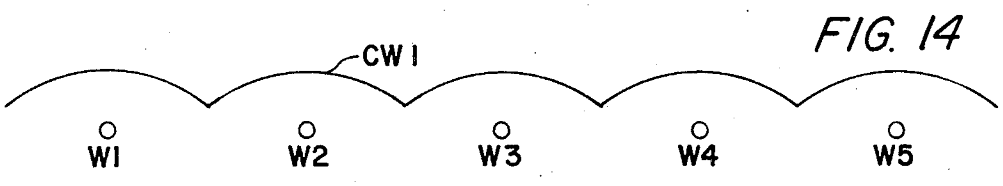
Figure 15:
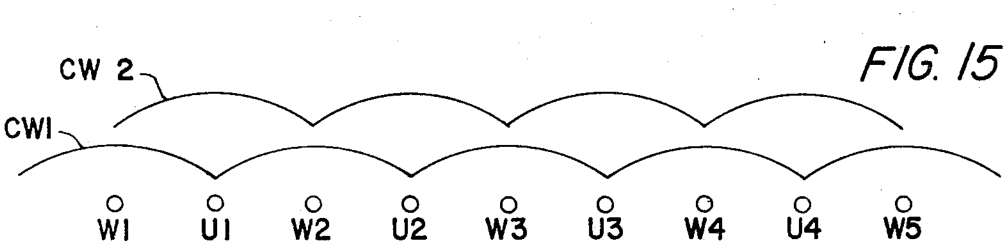
Figure 16:
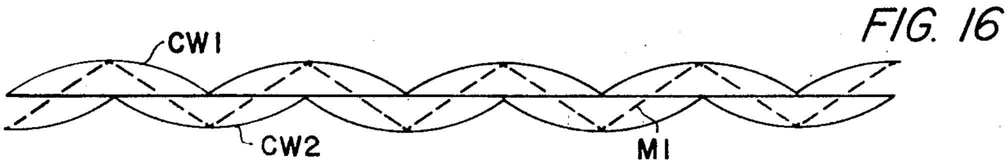
Figure 17:
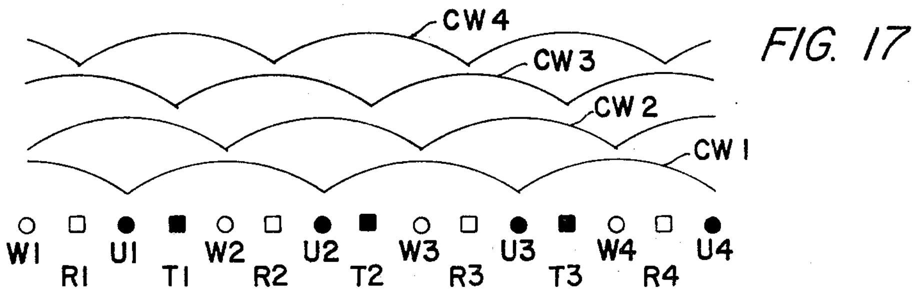
Figure 18:
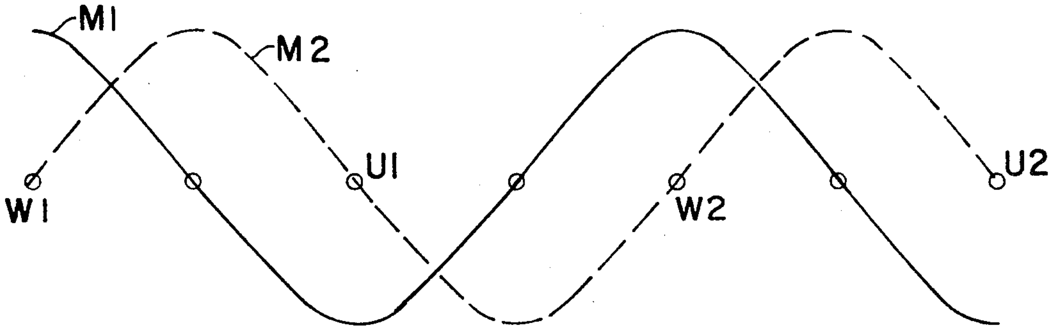
Figures 19, 20:
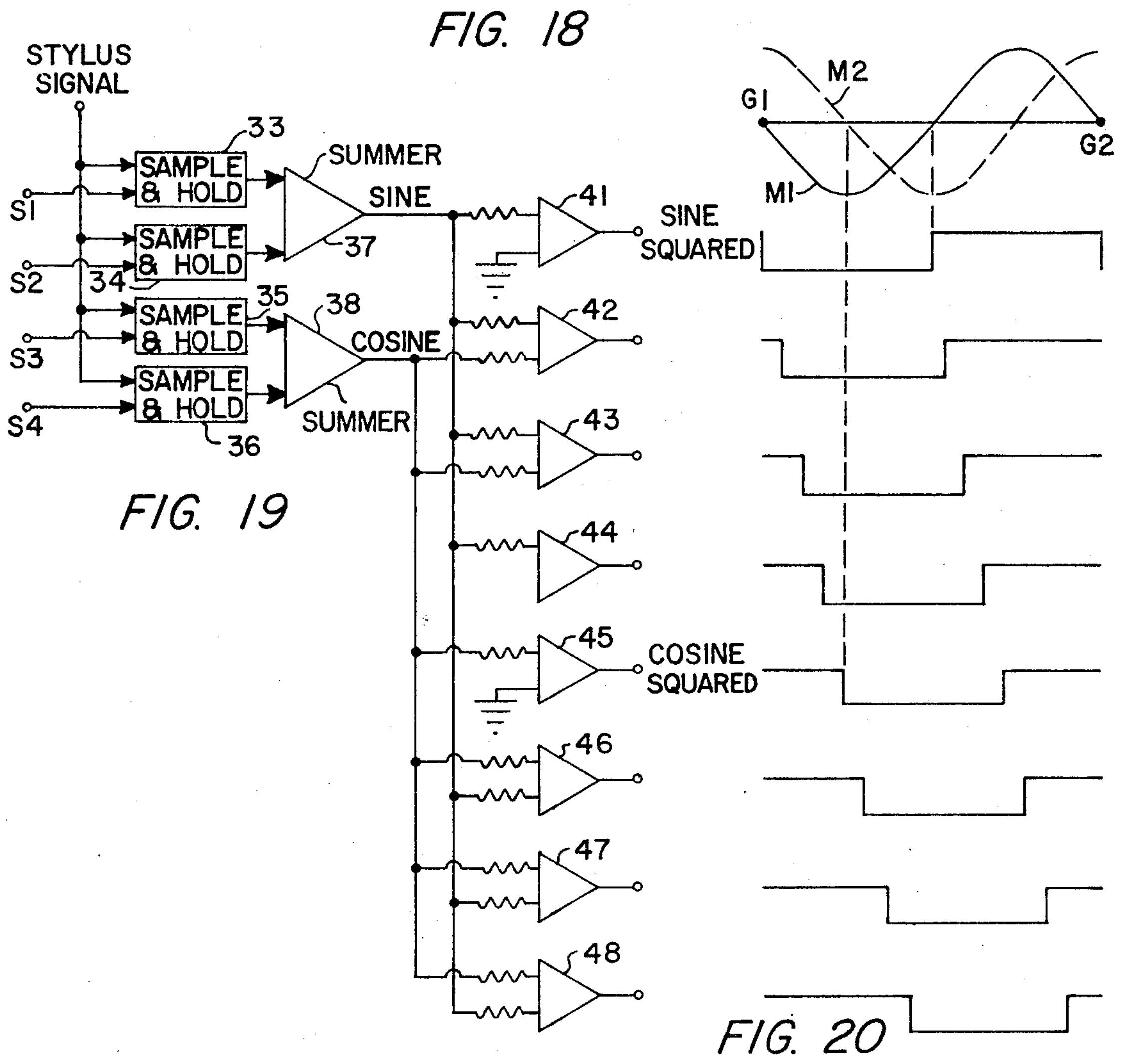
Figure 21:
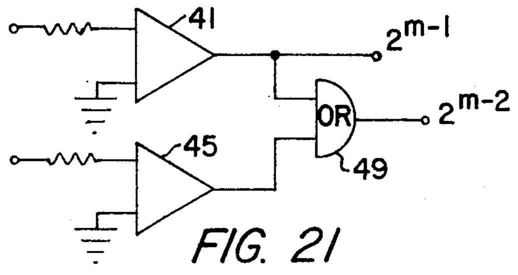
Figure 22:
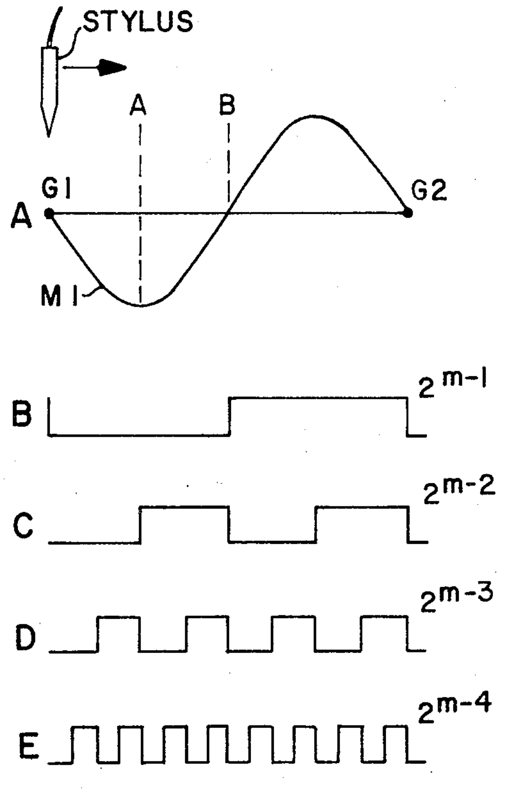

FIG. 9 symbolically depicts the arrangement of a crossover detector employed in the preferred embodiment of the invention;

FIG. 10 depicts the sequence of narrow pulses that are preferred over the wider pulses of FIG. 5;

FIGS. 11A to 11C illustrate typical waveforms occurring at points A, B, and C in the apparatus symbolically indicated in FIG. 12;

FIG. 12 depicts an arrangement of apparatus which permits the narrow pulses of FIG. 10 to be employed in the invention;

FIG. 13 is a plot of the stylus signal amplitude which is obtained when the stylus is moved across a pulsed wire of the fine grid;

FIG. 14 is a plot of stylus signal amplitude for a group of pulsed wires;

FIG. 15 depicts the signal amplitude plots obtained when two groups of wires are pulsed in turn;

FIG. 16 indicates the manner in which a periodic signal is developed from the signal amplitude plots;

FIG. 17 indicates the signal amplitude plots obtained when four groups of wires are each pulsed in its turn;

FIG. 18 depicts the basic "sine" and "cosine" signals generated in the invention;

FIG. 19 schematically shows the arrangement for generating the basic "sine" and "cosine" signals;

FIG. 20 shows phase displaced square waves emitted by the FIG. 19 comparators;

FIG. 21 shows a logic arrangement employed in the invention for providing outputs having digital significance;

FIG. 22 represents typical waveforms utilized to digitize the fine position of the stylus.

Figure 24:
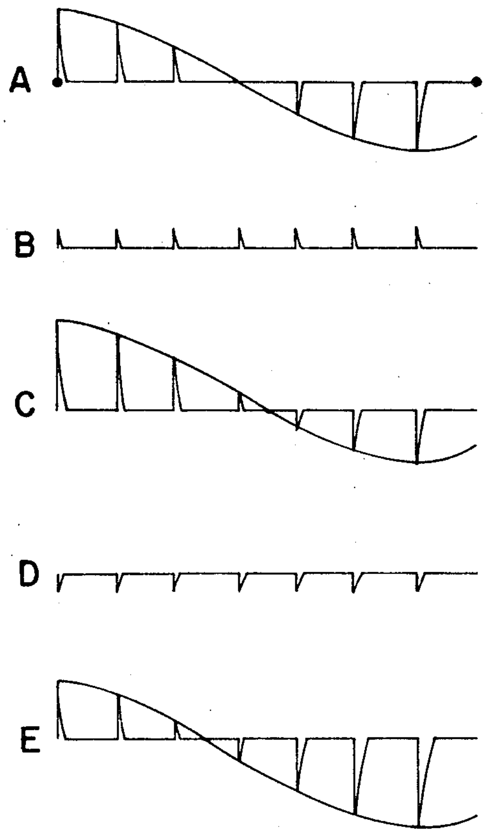
Figure 23:
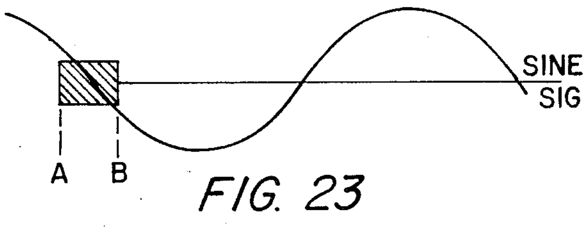
Figure 25:
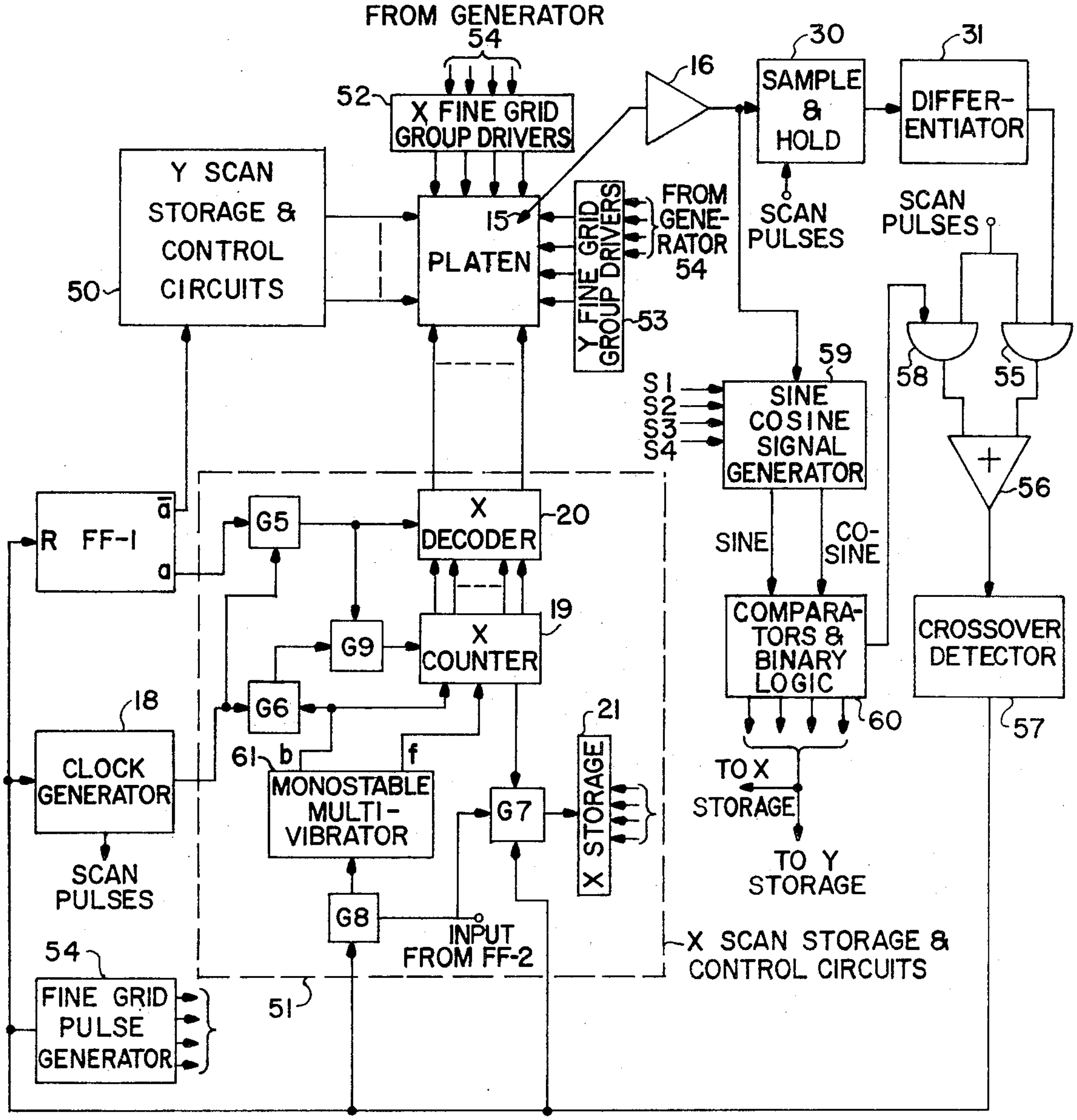

FIG. 23 shows the range within which the coarse grid crossover may occur in relation to the basic "sine" wave;

FIG. 24 shows waveforms occurring in the carry control; and,

FIG. 25 schematically shows the preferred embodiment of the invention.

THE EXPOSITION

Figure 1:
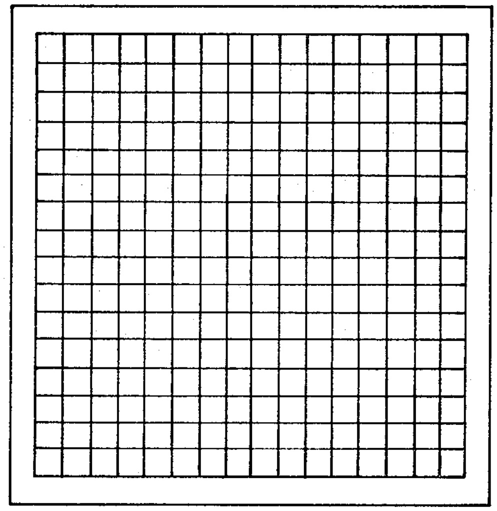

FIG. 1 depicts a platen having an electrically insulative surface whose area is divided into segments by a first set of parallel conductors crossing a second set of parallel conductors extending in another direction. For ease of exposition, the two sets of wires are shown as being orthogonal so that surface area is divided into squares. Any point on the surface of the platen can be defined by X and Y Cartesian coordinates.

Figure 2:
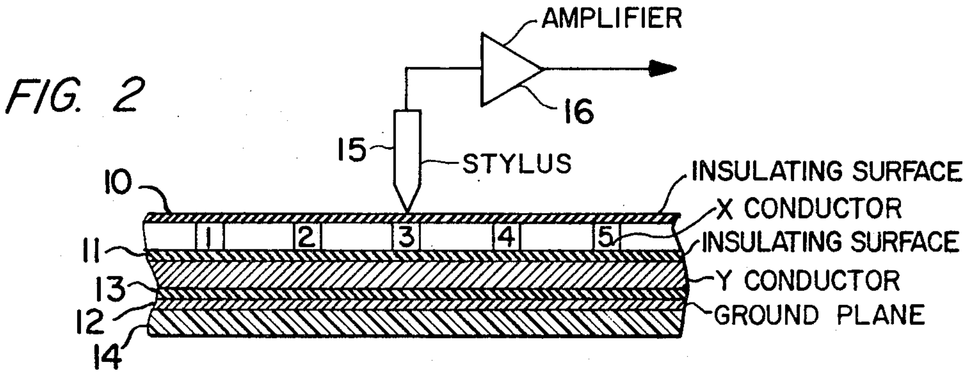

Turning now to the portion of the platen shown in cross-section in FIG. 2, the X Cartesian conductors are numbered 1, 2, 3, . . . starting from the grid's left edge. The X Cartesian conductors are situated between the upper insulative surface 10 of the platen and an intermediate insulative layer 11 which separates the set of X Cartesian conductors from the underlying Y set of Cartesian conductors. Below the two sets of conductors is "ground plane" 12 which is an electrically conductive sheet having an insulator 13 interposed between the ground plane and the lower set of parallel conductors. To provide an adequate support for the platen, the ground plane is disposed upon a support plate 14 which preferably is an insulative substance.

A stylus 15 is shown in FIG. 2 disposed directly above the third X Cartesian conductor. The stylus 15 has an electrical conductor at its tip which is coupled to the input of an amplifier 16. The electrical conductor may, for example, be a pencil lead to permit the stylus to be employed to mark a sheet of paper laid upon the platen. Inasmuch as the stylus 15 carries an electrical conductor, capacitance exists between the stylus and the subjacent conductor 3. To a lesser extent capacitance exists between the stylus and the other conductors in the X set as well as between the stylus and the conductors in the Y set. For the present, we need consider only the X set of wires in relation to the stylus.

Figure 3:
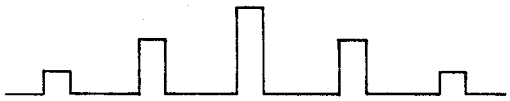
FIG. 3 illustrates the signals sensed by the stylus upon sequential pulsing of the coarse grid electrical conductors in the platen.

Assuming the X set of conductors are pulsed in sequence beginning with the conductor at the extreme left edge, the signals coupled by capacity to the stylus 15 and amplified by the amplifier 16 are ideally as shown in FIG. 3. The signal coupled to the stylus by the pulse applied to conductor 3 is of the greatest amplitude whereas the signals derived by the capacitive coupling to conductors 2 and 4 are equal and of lower amplitude and the signals obtained from conductors 1 and 5 are equal and of even smaller amplitude. It is evident that the output signal of the amplifier is greatest when the wire in closest proximity to the stylus tip is pulsed. Therefore, where the conductors of the set are pulsed in sequence, the position of the stylus tip can be ascertained in the X direction by determining when the maximum amplitude output pulse occurs in relation to the pulse sequence. Where the pulses in the sequence applied to the X set of conductors are also applied to a counter, the counter can be stopped when the maximum amplitude output signal is obtained to retain the value of the count in the counter. Alternatively, the system can be arranged to transfer the count in the counter to a storage register when the maximum amplitude output signal is obtained. In either case, the value of the count, which represents the X Cartesian coordinate of the position of the stylus tip, is retained.

In a comparable manner, by applying a sequence of pulses to the Y set of conductors, a counter can provide a count representing the Y Cartesian coordinate of the position of the stylus tip on the platen. While the Y coordinate is being determined, the X set of conductors are inactivated to minimize signal coupling from one set to another. Thus a number or count is obtained from each of the two sets of conductors in the grid and those two numbers define the X and Y coordinates of the position of the stylus tip on the platen.

Figure 4:
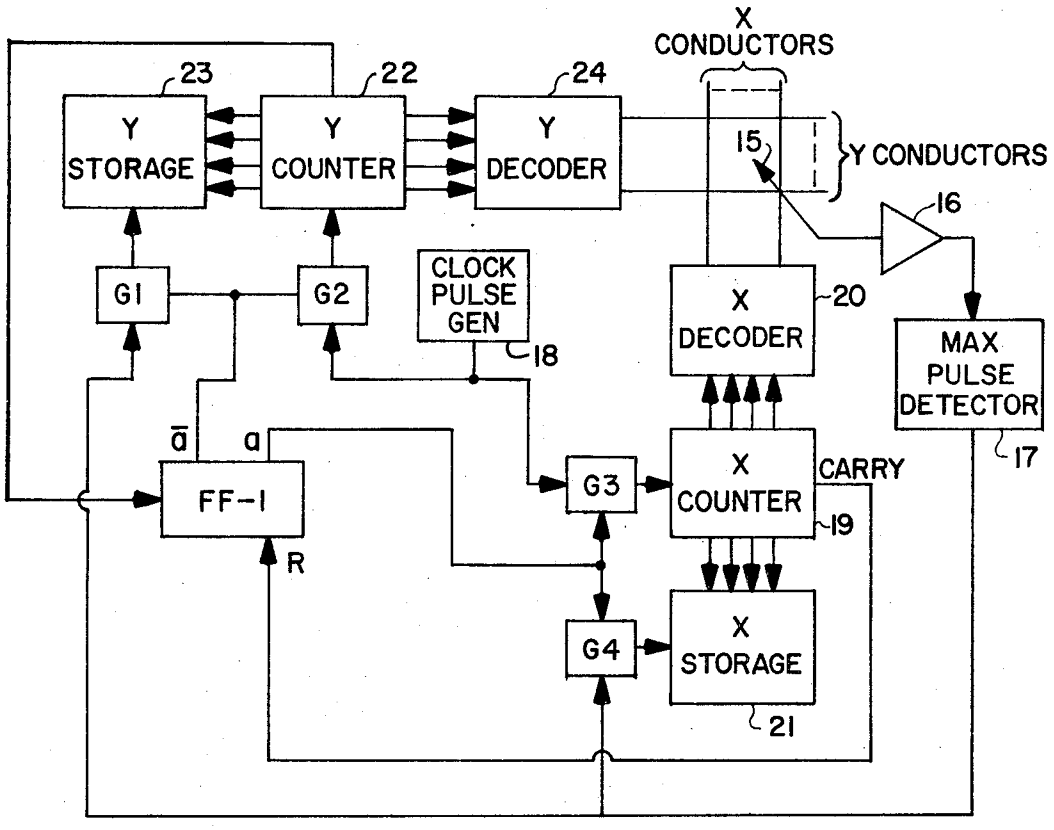
FIG. 4 shows the scheme of a rudimentary X - Y coordinate digitizing system.

The scheme of a rudimentary coarse resolution system is symbolically depicted in FIG. 4 where the stylus 15 is shown resting upon a platen having a grid formed by the set of X conductors crossing the set of Y conductors. The stylus is connected to the amplifier 16 whose output is coupled to the input of a maximum pulse detector 17. Upon detection of the maximum output pulse from amplifier 16, detector 17 emits an enabling signal to gate G1 and to gate G4. Gates G1 and G4 are enabled only when those gates receive an enabling signal from flip-flop FF-1 as well as from detector 17. One output of flip-flop FF-1 is coupled to gate G1 whereas the complementary output of that flip-flop is coupled to gate G4. Therefore gates G1 and G4 cannot be simultaneously energized since when one gate is enabled the other gate is inhibited.

Assuming flip-flop FF-1 is initially in the state where gate G1 is inhibited, the flip-flop emits an enabling signal to gate G4 and to gate G3. Gate G4, however, remains inactive until it receives a signal from detector 17. Clock pulses are impressed from a clock pulse generator 18 to gates G2 and G3. Gate G2 is inhibited since it is connected to the same output of FF-1 as is gate G1. Therefore, only gate G3 is enabled by the clock pulses and the output of that gate causes counter 19 to advance with each clock pulse. The clock pulses are synchronized with the pulse signals applied in sequence to the X set of conductors by the decoder 20 which is controlled by counter 19. As the count in the counter increases, the decoder causes the pulse to be applied to the next conductor in the set. Assuming the pulse signals are applied to the X set of conductors when gate G3 is enabled, X counter 19 will accumulate a count with each clock pulse passing through gate G3. When detector 17 detects the maximum amplitude pulse emitted from amplifier 16, the detector emits a pulse signal which activates gate G4 and causes the count in the X counter to be transferred to the X storage register 21. The X counter however continues to count with each clock pulse until it reaches a count where it emits a carry signal to the reset (R) input of flip-flop FF-1. The flip-flop thereupon changes states, causing gates G1 and G2 to be enabled while inhibiting gates G3 and G4.

The sequence of operations is then repeated to cause the Y counter 22 to accumulate a count which is transferred into the Y storage register 23 when the detector 17 detects maximum amplitude pulse from the Y set of conductors, The Y decoder 24 insures that the lines of the Y set are pulsed in the proper sequence in relation to the clock pulses from clock pulse generator 18 which pass through gate G2 to the Y counter 22.

Figure 6:
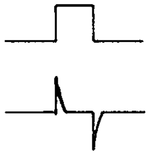
FIG. 6 illustrates the spikes obtained by differentiating a scan pulse.
Figure 7:
FIG. 7 shows the sequence of differentiated signals obtained from the stylus in response to the FIG. 5 scan pulses.

In actual operation of the system, the capacity between the stylus and the conductors is quite small and there is enough resistance coupled with that capacity to cause the signals obtained from the stylus 15 to be differentiated. To obtain sharp differentiation, the pulses applied to the conductors of the X and Y sets preferably have steep leading and trailing edges. An advantage is obtained where the sequence of pulses, as indicated in FIG. 5, is such that the trailing edge of one pulse is coincident with the leading edge of the next pulse in the sequence. In FIG. 5, the first scan pulse P1 is applied to the first wire of a set, the second scan pulse P2 is applied to the next wire in the set, and so on. For facility of exposition the term "wire" here used means a conductor of the set and the pulses applied to those wires are denoted "scan" pulses. Where the pulse rise time and fall time are equal, the amplitude of the "-spikes" obtained from the differentiated pulse are equal, as indicated in FIG. 6, although one "spike" is inverted relative to the other. The stylus thus receives a signal which is the difference between a negative signal from the wire being turned "off" by the trailing edge of a pulse and the positive signal coupled from the wire being turned "on" by the leading edge of the next pulse. Assuming, the sequence of scan pulses applied to the set of wires are as shown in FIG. 5, with equal rise and fall times, and that the stylus is disposed directly over the third wire of the set, as in FIG. 2, the differentiated signals obtained from the amplifier is as shown in FIG. 7. As the wires are pulsed in the order from 1 to 5, the stylus "sees" positive going spikes that progressively increase in amplitude as the scan approaches from the left because the wire turning "on" is always closer to the stylus than the wire turning "off" and sees negative going spikes that decrease in amplitude as the scan proceeds to the right away from the stylus because the wire turning "off" is closer to the stylus than the wire turning "on". The spikes, of course, reach their maximum amplitude when the third wire in the set is scanned.

Figure 8:
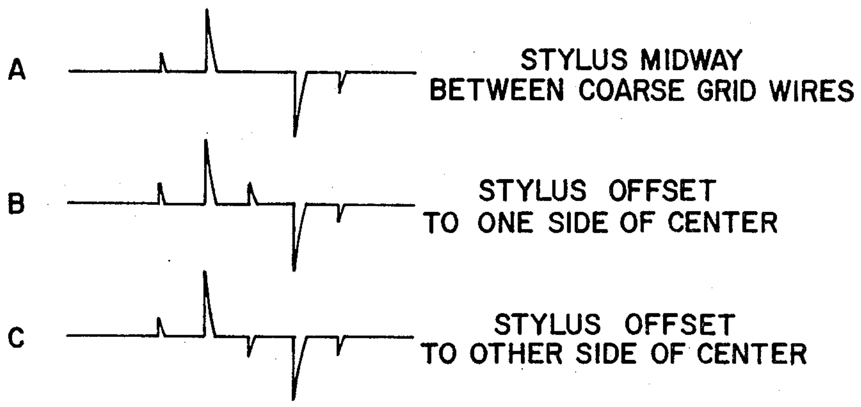
FIG. 8 shows illustrative waveforms obtained from the stylus when it is situated between two coarse grid wires.

Consider now the situation where the tip of the stylus is moved to a position between two wires of the set rather than being disposed directly above a wire. Where the stylus is moved so that it recedes from one wire and approaches the other, the capacity to the receding wire decreases while the capacity to the wire being approached increases until those capacities are equal when the stylus is midway between the two wires. Assume that the stylus in FIG. 2 is moved from its position above wire 3 toward wire 4, while those wires are being scanned. Initially the wire 3 induces almost equal positive and negative spikes because the probe is close to that wire, but as the stylus moves toward wire 4, the negative spike decreases in amplitude because of the increasing amplitude of the positive spike derived from the capacitive coupling of the stylus to wire 4 until the "inbetween" signal becomes zero when the stylus is precisely centered between the two wires. Thus, the exact center or "crossover point" between any two adjacent wires of the set can be ascertained by determining when the "inbetweeen" signal from the stylus becomes zero. Further, when that signal is negative, it is known that the stylus is closer to one wire whereas if the signal is positive, it is known that the stylus is closer to the other wire. FIG. 8A depicts the differentiated spikes obtained when the stylus is precisely centered between the wires, FIG. 8B depicts the sequence of spikes when the stylus is offset to the right of center, and FIG. 8C depicts the sequence when the stylus is offset to left of center. In the foregoing explanation, it has been assumed that the scan always proceeds from left to right and that the scan pulses are positive going pulses of the type shown in FIG. 5. It would, of course, be an obvious change, to use negative going scan pulses or to scan the set of wires in the opposite direction, that is, from right to left. Where such changes are employed, the effect upon the sequence of differentiated signals can readily be deduced by those familiar with the operation of electrical circuits.

To obtain a "coarse" indication of the location of the stylus on the platen when that stylus is between two wires of the set and is closer to one line than the other, the count representing the closer wire is used. For example, where the tip of the stylus is between wires of "lines" 3 and 4 but is closer to line 3, the count representing line 3 is used. Thus, where the "in-between" signal is a negative spike, the "coarse" indication will be line 3 whereas if that signal is a positive spike, the "coarse" indication will be line 4.

Inasmuch as the "inbetween" signal is zero at the "-crossover point", a "crossover" circuit for determining where the stylus is in relation to the crossover point is schematically depicted in FIG. 9. The output of the amplifier 16 (FIG. 2) is applied to a positive detector 26 which gives an output for all positive "spikes" or "-derivatives" and to a negative detector 27 which gives an output for all negative derivatives (viz., negative "-spikes"). The output of positive detector 26 is coupled to the "set" input of flip-flop FF-2 and the "reset" input of the flip-flop is actuated by the output of the negative detector 27. One output of the flip-flop is coupled to a differentiator constituted by the capacitor C1 in series with a resistor R1. A diode D1 is arranged in shunt with the resistor R1 to by-pass negative going signals to ground. Assuming flip-flop FF-2 is placed in the "set" state when the first positive spike above a minimum value causes the positive detector 26 to emit a signal to the flip-flop's "set" input, the $\overline{Q}$ output of the flip-flop goes "low" (that is the $\overline{Q}$ output of the flip-flop drops to a lower potential), whereupon a negative pulse appears at the output of the differentiator which is by-passed to ground by diode D1. When a negative spike is emitted at the stylus output, negative detector 27 causes flip-flop FF-2 to be reset, whereupon the $\overline{Q}$ output goes "high" (i.e., rises to a higher potential) and causes a positive "crossover" pulse to appear at the output of the differentiator. In the system arrangement shown in FIG. 4, the crossover detector of FIG. 9 corresponds to the box 17 labeled maximum pulse detector. Therefore, the positive crossover pulse output of the detector causes the count in the counter to be transferred to the storage register.

In the preceding exposition of the "crossover point", it was assumed that the rise and fall time of scan pulses were equal. That is, it was assumed that the leading edge and trailing edge of the scan pulse were equally steep. In practice, the asymmetrical characteristics of the devices (i.e., line drivers) that supply the scan pulses to the lines and effects due to hand capacity make the assumption an ideal case that is not often achieved. Inasmuch as the crossover point was defined as that point where the sum of the derivatives became zero (i.e., the point where the amplitudes of the positive and negative spikes were equal), it can be appreciated that an offset of the true crossover point occurs where the rise and fall times of the scan pulses are unequal.

In the FIG. 4 system, the tendency of the crossover point to be offset from its true position can be compensated by employing scan pulses of narrow width as indicated in FIG. 10. For comparison, the scan pulse width of FIG. 5 is indicated in phantom in FIG. 10. The signals obtained from the stylus in response to the narrow scan pulses are shown in FIG. 11A. The stylus signal from amplifier 16 is fed to a sample and hold circuit 30 as depicted in FIG. 12. The sample and hold circuit may be of the conventional type which follows the amplitude of the signals impressed on its input, wherefore the output of the sample and hold circuit 30 is the stepped waveform shown in FIG. 11B. The output of the circuit 30 is coupled to a differentiator 31, as schematically shown in FIG. 12. The output of the differentiator is the sequence of spikes shown in FIG. 11C. That sequence is identical with the sequence of pulses shown in FIG. 7 and therefore the arrangement shown in FIG. 12 is equivalent to employing the wider scan pulses of FIG. 5. The principal advantage to employing narrow scan pulses is to materially reduce the susceptibility of the system to driver characteristics and to the effects of hand or body capacitance.

The coarse grid system thus far described may be adequate where low resolution is acceptable. By crowding the coarse grid wires closer together the resolution can be somewhat improved but a point is soon reached where the system cannot distinguish between coarse grid lines because of their proximity. Where higher resolution is desired it is, in accordance with the invention, obtained by subdividing the area between the wires of the coarse grid. In the high resolution embodiment of the invention, the coarse grid system is conjoined with a fine grid system which provides the means to subdivide the area between coarse grid wires. The procedure for obtaining the requisite subdivision is based on repetitive trignometric functions. In this procedure two sinusoids which are 90° out of phase and have a cycle length equal to the interval to be divided, form the basic signals. It is well known to those versed in signal processing technology, that by combining appropriate ratios of these two basic signals (which, for convenience are here designated "sine" and "cosine" signals), other sinusoids may be produced with phase angles which are retarded or advanced with respect to the original basic signals. For example, to divide an interval into 16 parts, 8 phase displaced sinusoids may be employed to provide a total of 16 points at which those signals cross the zero axis. The number of crossovers occurring over the interval determine the number of divisions in the interval. By causing the sinusoids to be successively phased displaced by 22 ½° over an interval of 360°, the 360° interval is subdivided into 16 equal parts by the zero axis crossovers.

To understand the manner in which the basic "sine" and "cosine" signals are generated by the fine grid system, consider FIG. 13 in which the line L1 represents the plot of signal amplitude obtained from the stylus as the stylus is moved transversely to the wire W1 as the wire is repetitively pulsed. Where the plot for stylus signal strength is obtained for a number of wires W1, W2, . . . regularly spaced apart in the manner depicted in FIG. 14, the cusped waveform CW-1 is obtained even when all the wires in the group are pulsed together. Where a second group of wires U1, U2, . . . is interleaved with the first group of wires W1, W2, . . . as shown in FIG. 15, and each group of wires is pulsed in turn, the two cusped waveforms CW-1 and CW-2 can be obtained by plotting amplitude of the signals obtained from the stylus. The CW1 and CW2 can be combined to obtain one of the basic sinusoidal signals by inverting one of the cusped waves and algebraically summing the signal amplitudes of the waveforms CW1 and CW2. This is indicated in FIG. 16 by the inversion of the waveform CW2 and by waveform M1 which is derived from the algebraic summation of CW1 and CW2. The M1 waveform while not necessarily sinusoidal, is periodic and its amplitude changes with displacement along the coordinate axis. For convenience the M1 waveform is here termed the "sine" wave although that waveform may in fact more closely approach the form of a triangle or a trapezoid. Assuming third and fourth groups of wires are disposed, as indicated in FIG. 17, to interleave with the W1, W2, . . . and U1, U2, . . . wire groups and that each group of wires is pulsed in turn, two additional cusped waveforms CW3 and CW4 are obtained. The CW3 and CW4 waveforms are combined in the manner previously explained to obtain the periodic waveform M2 shown in FIG. 18. It is apparent that waveform M2 is shifted in phase relative to waveform M1. Upon considering the interval between wires W1 and W2 to represent 360°, it can be appreciated that waveforms M1 and M2 differ in phase by 90°. Inasmuch as the M1 waveform has been termed the "sine" wave, the M2 waveform is here designated the "cosine" wave.

In the preceding discussion, all the wires in a group are described as driven in parallel so that all the wires in the group are pulsed together. By so operating the fine grid system, only four drivers are required for the X Cartesian set and only four drivers are required for the Y Cartesian set.

In constructing the platen of FIG. 1 the fine wire set may be separate conductors disposed in a plane just above or just below the coarse set of wires. The coarse set of wires can be merged into the fine set of wires and a gate may be utilized to permit the same wire to be used for both coarse and fine resolution. Using the single grid wire avoids the problem of constructing the platen so that the coarse grid wires precisely register with the fine grid wires. Further using the single grid wire for both purposes avoids the problem of separating the coarse grid from the fine grid in the platen and thereby keeps the number of wire layers needed to one for each coordinate axis. Where a separate coarse grid is employed, two layers of wires are needed in the platen for each coordinate axis. Thus for a two axis system, four layers of wires are needed in the platen with each layer being insulated from the others. The lesser number of wire layers conduces to a system having a better signal to noise ratio. However, when driver characteristics and their cost are considered, economics may make it more desirable to avoid combining functions and to therefore employ a platen having four layers of wires.

FIG. 19 schematically shows the arrangement for utilizing the stylus signals derived from pulsing the groups of wires in the "fine" set to generate the sine and cosine signals. Inasmuch as each group of wires is pulsed in its own exclusive time interval, the sample and hold devices 33, 34, 35, 36 are arranged to store the signals from the stylus. When the W1, W2, . . . set of wires is pulsed a signal S1 is simultaneously applied to cause device 33 to sample the output of the stylus and hold the sampled signal. Similarly, when the U1, U2 . . . set of wires is pulsed a signal S2 is simultaneously impressed on the device 34 to cause that device to sample the output of the stylus and hold the sampled signal. A similar sequence of operations occurs when wires R1, R2 . . . and T1, T2 . . . are pulsed. The outputs of sample and hold devices 33, 34 provide the inputs to summer 37 and the output of that summer is the basic "sine" signal. Similarly, the outputs of sample and hold devices 35, 36 provide the inputs to summer 38 whose output is the basic "cosine" signal. Of course, those basic signals vary in a periodic manner when the stylus is moved along the coordinate axis. The rate at which those signals vary depends upon the speed of movement of the stylus. Where the stylus is stationary, the sine and cosine signal outputs are d.c. signals.

The sine and cosine signal outputs of summers 37 and 38 provide the inputs to a group of comparators 41, 42, 43, 44, 45, 46, 47, 48 whose outputs are the square waves depicted in FIG. 20. Comparator 41 emits a square wave, for example, which makes its transition when the stylus passes through the zero crossing of the M1 "sine" wave. Thus the output of comparator 21 may be termed the "sine square" wave. Comparator 42 emits a square wave that is displaced in phase by 22 ½° relative to the square wave emitted by comparator 41. When the stylus is moved over a whole cycle of the sine wave (that is moves from one coarse grid wire to the adjacent coarse grid wire) the comparators 41 to 48 each emit a square wave which has its transition at a different point along the basic sine wave.

The square wave output of comparator 41 can be used to signify a binary digit. For example when the output of that comparator is "low", it may represent a binary ZERO whereas when the output is high, it represents a binary ONE. Where the stylus passes through the zero axis crossing of the "sine" signal, the output of comparator 31 changes from "low" to "-high". Thus, in effect, the interval between coarse grid wires G1 and G2 is subdivided into two equal parts. To subdivide that interval into four equal parts, the outputs of comparators 41 and 45 are applied to the inputs of an exclusive OR device 49, as indicated in FIG. 21. The output of the exclusive OR device 49 is the waveform shown in FIG. 22C. As the stylus is moved from coarse grid wire G1 toward coarse grid wire G2, in FIG. 22A, the output of the exclusive OR changes from a binary ZERO to a binary ONE when the stylus reaches the point A on the sine wave M1 and changes back to a binary ZERO when the stylus reaches point B of the sine wave. The square wave emitted from comparator 41 is shown in FIG. 22B to indicate that it also represents a binary bit since it will change from a binary ZERO to a binary ONE when the stylus reaches point B on the sine wave. By suitable logical arrangements, well known to those skilled in the art of electronic logic design, the waveforms shown in FIGS. 22D and 22E may be utilized to provide additional binary bits. By sampling the waveforms in 22B, 22C, 22D, and 22E, the position of the stylus can be ascertained to be in any of 16 subdivisions between the coarse grid wires G1 and G2. Further, since each of those sampled waveforms will be either a binary ONE or a binary ZERO, the position of the stylus is digitized.

It is well known to those versed in the art of counters that in counting in a number system, a coarser digit must always change together with a finer digit. For example, in the decimal system, a coarse digit may only change when the finer (i.e. lower order) digit changes from a 9 to 0 ) or from a 0 to a 9. In the binary system, a coarser binary bit may only change value when the next finer bit changes from a ONE to a ZERO or from a ZERO to a ONE. In the invention, the sine square signal of FIG. 22B is the first bit of the fine interval and the next coarser bit is the fine bit of the scan counter (the counter 19 or 22 in FIG. 4). That counter changes its count when the scan pulse derivative (obtained from the stylus) changes from a positive spike to a negative spike. The sine square signal (FIG. 22B) also makes a transition in approximately the same area of the platen in between the coarse grid lines. Except in the ideal case, inaccuracies, both mechanical and electrical, in the system preclude the coarse grid crossover and the transition of the sine square signal from occurring simultaneously. It is therefore necessary to electrically couple the sine square signal (bit $2^{m-1}$) and the coarse grid signal (bit $2^m$) to insure that the counter changes count simultaneously with the occurrence of the transition of the sine square signal. In number terminology this transfer of information from a finer bit to a coarser bit is known as a "carry". Consequently, the circuits which transfer the information are known as carry circuits.

The relationship of the scan derivative with the sine signal crossover is shown in FIG. 23. The shaded area defines the range of possible crossover points of the coarse grid signal. The basic "sine" signal is shown as crossing the zero axis in the middle of the shaded area. In a manner similar to that by which the plot of FIG. 13 was obtained, a plot of the amplitude of the scan derivative as the stylus is moved between two coarse grid lines is depicted in FIG. 24A. Where a series of small positive derivatives, as shown in FIG. 24B is summed with the FIG. 24A derivatives, the amplitude plot of FIG. 24C results. Where a series of small negative derivatives, as shown in FIG. 24D is summed with the FIG. 24A derivatives, the plot of FIG. 24E results. Inasmuch as the horizontal axis of these plots represent displacement of the stylus between two grid wires. FIGS. 24C and 24E indicate that the effective coarse grid crossover may be moved electrically.

In the invention, the polarity of the summed derivative is controlled by the basic "sine" signal. Where the crossover is approached by moving the stylus from left to right in FIG. 24, a small positive derivative is summed with the stylus signal, effectively causing the crossover to be retarded (that is to occur slightly later than it would ordinarily occur). As the stylus is moved further to the right, the sine square signal makes its transition. When that transition occurs, small negative derivatives are summed with the stylus signal, causing the coarse grid crossover to advance sufficiently to cause the detector to sense a crossover of the coarse grid signal. Both the fine interval and the coarse grid count thus change together. The small derivatives are obtained from the sine square signal since that signal is of the correct polarity with respect to the coarse grid crossover. By concurrently gating the sine square signal and the differentiated stylus signal into a summing circuit, the appropriate carry control is achieved. As is understood by those familiar with the electronic art, the gated sine square signal is attenuated to obtain derivatives which are of the required amplitude since the carry control must function within limits imposed by the smallest subdivision.

The preferred embodiment of the invention is schematically shown in FIG. 25. For simplicity, the Y scan, storage, and control circuits in block 50 are not depicted since they are identical to the X scan, storage, and control circuits shown in the block 51.

As was previously explained in connection with the more rudimentary arrangement of FIG. 4, the coarse sets of wires in the platen receive their scan signals from the X decoder 20 and the Y decoder 24 (FIG. 4). In the more complex arrangement of FIG. 25, the platen also has fine sets of wires which are electrically pulsed in groups. When determining the digitized X coordinate of the stylus 15 on the platen, the fine wires are pulsed in groups by the fine grid group drivers in block 52 whereas when the digitized Y coordinate of the stylus is determined, the fine wires in the Y set are pulsed in groups by the drivers in block 53. The group drivers 52 and 53 receive their input signals from the fine grid pulse generator 54 so that in each fine wire set the groups are driven in turn.

To better understand the operation of the coordinate digitizer system of FIG. 25, assume that the Y counter (FIG. 4) is activated by pulses from clock generator 18 whereby the scan pulses are impressed in sequence upon the coarse wires of the Y coordinate axis. As the Y scan approaches the position of stylus 15, the stylus emits pulses to the amplifier 16. The amplified pulses from amplifier 16 are applied to the sample and hold circuit 30 which samples the amplifiers output in response to scan pulses from clock generator 18. The output of the sample and hold circuit is differentiated by the differentiator 31 and derivative signals are fed to AND gate 55. The AND gate is enabled by scan pulses from clock generator 18 and the output of AND gate 55 is fed to a summer 56 whose output is coupled to the input of crossover detector 57. Summer 56 also receives an input from AND gate 58 for carry control. When the crossover of the coarse grid scan is detected, a "crossover" signal is emitted by detector 57. The "crossover" signal causes flip-flop FF-1 to change states and the flip-flop thereupon emits an enabling signal to gate G5. The "crossover" signal also actuates fine grid pulse generator 54 and that generator emits four signals in time sequence to pulse the groups of wires in the fine X set by means of group drivers 52. Stylus 15 thereupon receives four pulse signals whose amplitudes are determined by the position of the stylus on the platen. The four pulse signals are amplified by amplifier 16 and are gated into sample and hold devices 33 to 36 (FIG. 19) which are within the sine cosine signal generator block 59. The basic sine and cosine signals from signal generator 59 are applied to comparators 41 to 48 (FIG. 19) which are within block 60. The sine squared wave from comparator 41 (FIG. 19) is applied to an input of AND gate 58. The binary coded output signals (FIG. 22) from the binary logic (FIG. 21) in block 60 are applied to the X storage 21. After each of the groups in the X fine wire set have been pulsed, clock generator 18 emits clock pulses to OR gate G6. The clock pulses pass through OR gate G6 to the X counter 19 and causes that counter to count in the forward direction to increase its count with each received clock pulse. The counter is of the reversible type and its direction of count is controlled by monostable multivibrator 61. Where output *f* is enabled, the counter counts forward; where output *b* is enabled the counter counts back in the reverse direction upon the reception of each clock pulse. Assuming the *f* output of monostable multivibrator 61 is enabled, counter 19 counts in the forward direction and as its count increases, the X wires in the coarse grid are pulsed in sequence. When the X scan approaches the position of stylus 15, the pulses received by the stylus become appreciable in amplitude and those pulses are fed into amplifier 16. The amplified pulse signals are applied to sample and hold circuit 30 and through differentiator 31 to an input of AND gate 55 in the carry control. When crossover detector 57 again emits a "crossover" signal, flip-flop FF-1 is caused to change states. Further, the "crossover" signal actuates gate G7 which causes the count in X counter 19 and the fine binary bits from the binary logic in block 60 to be transferred into X storage 21. The "crossover" signal also enables gate G8, causing the monostable multivibrator 61 to be triggered to its unstable state. In its unstable state, the *b* output of the multivibrator is enabled causing the counter to count in the reverse direction when it receives a clock pulse. The b output also enables gate G6, allowing clock pulses to be applied through gates G6 and G9 to counter 19. Clock pulses cannot however pass through gate G5 to X decoder 20. X counter 19 counts in the reverse direction until multivibrator 61 returns to its normal state. The running time of the multivibrator is preferably sufficient to permit about six clock pulses to pass to the counter. Of course, while the counter is counting back, the X coarse grid is not being scanned since at the time flip-flop FF-1 changed states, the Y scan, storage and control circuits were activated to commence digitizing the position of the stylus along the Y coordinate axis. Thus each coordinate axis is alternately scanned and the position of the stylus is digitized. The cycle is repeated and continues as long as the stylus is able to obtain appreciable signals from pulsing of the wires in the platen. If the stylus is lifted off the platen a sufficient distance to decouple it from the wires in the platen, the axis last scanned will continue to scan the complete grid for that axis until the stylus again emits appreciable signals. Thereupon, the repetitive cycle of scanning alternate axes is resumed. When the stylus is lifted off the platen, the last digitized coordinate reading is retained in storage.

While a preferred embodiment of the invention has been described, it is obvious to those skilled in the art that the invention can take other forms. For example, although the coarse grid wires are described as uniformly spaced along the coordinate axis, it is apparent that the spacing of the coarse grid wires may be logarithmic or in accordance with some other mathematical function. The platen need not be a flat surface nor need the coordinate axes be orthogonal. Where desired, the platen can be arranged to digitize the position of the stylus as polar coordinates. Further, while the exposition of the fine grid system describes the groups of fine wires as being pulsed in turn, it is obvious that the pulse can be applied to the stylus and the signal obtained from the fine wire group. That is the stylus can be employed to "transmit" the pulse, and each fine wire group can collectively be used as a "receiver" to obtain a signal.

In view of the obvious modifications that can be made in the embodiments of the invention here described and in view of the different forms that the invention can take, it is not intended to limit the invention to the precise arrangements illustrated in the drawings or described in the exposition. Rather it is intended that the scope of the invention be delimited by the appended claims and that within that scope be included such structures as depart from the essential nature of the invention only by obvious changes or by the substitution of equivalents that do not alter the basic scheme of the invention.

I claim:

1. A system for digitizing the position of a stylus on a coordinate axis, the system comprising
 a platen having a coarse set of parallel wires spaced along the coordinate axis,
 the stylus having an electrical conductor providing capacitive coupling to the coarse set of wires,
 means associated with the stylus for causing differentiation of the stylus output signals,
 scan pulse means for electrically pulsing in sequence wires of the coarse set, the pulses being contiguous whereby the trailing edge of one pulse is concurrent with the leading edge of the next succeeding pulse in the sequence,
 a counter coacting with the scan pulse means to cause the count in the counter to identify the wire being pulsed,
 a crossover detector, the differentiated output signals of the stylus being coupled to the input of the crossover detector, the crossover detector emitting an output signal upon detecting a change in polarity of the differentiated output signals from the stylus, and
 means coupled to the output of the detector for indicating the count in the counter upon emission of an output signal from the detector.

2. A system, according to claim 1, for digitizing the position of a stylus on a second coordinate axis, wherein
 the platen has a second coarse set of parallel wires spaced along the second coordinate axis,
and the system further includes
 additional scan pulse means for electrically pulsing in sequence wires of the second coarse set,
 a second counter coacting with the additional scan pulse means to cause the count in the second counter to identify the wire being pulsed in the second coarse set,
 means for alternately scanning the first and second coarse sets of wires, and
 means operative during the scanning of the sets of wires along the first coordinate axis for causing the counter for the second coordinate axis to alter its count by a predetermined amount whereby the succeeding scan along the second coordinate axis commences at the location corresponding to the altered count of the counter.

3. A system according to claim 1 for digitizing the position of a stylus on a coordinate axis, the system further comprising
 a fine set of parallel wires on the platen, the fine set being more closely spaced along the coordinate axis than the wires of the coarse set, the wires of the fine set constituting groups, the wires of each group being interleaved with the wires of the other groups whereby the wires of the groups occur repetitively in the same successive order along the coordinate axis, pulse means for electrically pulsing all the wires of a group together, the pulse means causing each group to be separately pulsed in its turn, and signal processing means coupled to the output of the stylus, the signal processing means being responsive to the amplitude characteristics of the signals capacitively coupled to the stylus from the groups of wires in the fine set, and the signal processing means providing digital signals representing divisions of the internal between coarse grid lines.

4. A system according to claim 3 for digitizing the position of a stylus on a coordinate axis, wherein the signal processing means comprises sample and hold means responsive to signal amplitude for sampling the output of the stylus concurrently with the pulsing of each group of wires in the fine set and storing the sampled signals, and combining means responsive to the amplitude of the stored sampled signals for providing first and second basic signals, each basic signal varying periodically as the stylus is moved along the coordinate axis, the basic signals being out of phase whereby the ratio of one basic signal to the other is unvarying for any stationary position of the stylus.

5. A system, according to claim 4, for digitizing the position of a stylus on a coordinate axis, wherein the signal processing means further comprises means responsive to the first and second basic signals for providing digital output signals representing divisions of the interval between coarse grid wires.

6. A system according to claim 5, for digitizing the position of a stylus on a coordinate axis, wherein the system further comprises carry circuit means for causing the count in the counter to change concurrently with a change in the digital output signal of the signal processing means which represents the next finer bit to the coarse bit in the counter.

7. A system according to claim 6, for digitizing the position of a stylus, wherein the platen has second coarse and fine sets of parallel wires spaced along a second coordinate axis, and the system further includes additional scan pulse means for electrically pulsing in sequence wires of the second coarse set, additional pulse means for electrically pulsing the second fine set of wires in groups, a second counter coacting with the additional scan pulse means to cause the count in the second counter to identify the wire being pulsed in the second coarse set, means for alternately scanning the first and second sets of parallel wires to alternately obtain a digitized coordinate for each axis, and means operative during the scanning of the sets of wires along the first coordinate axis for causing the counter for the second coordinate axis to alter its count by a predetermined amount whereby the succeeding scan along the second coordinate axis commences at the location corresponding to the altered count of the counter.

8. A system for digitizing the position of a stylus on a coordinate axis, the system comprising a platen having a coarse set of parallel wires spaced along the coordinate axis, the stylus having an electrical conductor providing capacitive coupling to the coarse set of wires, scan pulse means for electrically pulsing in sequence wires of the coarse set, a counter coacting with the scan pulse means to cause the count in the counter to identify the wire being pulsed, sample and hold means coupled to the output of the stylus, the sample and hold means causing the output of the stylus to be sampled concurrently with the pulsing of the wires of the coarse set, a differentiator, the input of the differentiator being coupled to the output of the sample and hold means, a crossover detector having its input fed by the output of the differentiator, the crossover detector emitting an output signal upon detecting a change in polarity of the signals emitted by the differentiator, and means coupled to the output of the detector for indicating the count in the counter upon emission of an output signal from the detector.

9. The system according to claim 8 wherein the platen has a second coarse set of parallel wires spaced along a second coordinate axis, the system being arranged to digitize the position of the stylus on the second coordinate axis, the system further including additional scan pulse means for electrically pulsing in sequence wires of the second coarse set, a second counter coacting with the additional scan pulse means to cause the count in the second counter to identify the wire being pulsed in the second coarse set, means for alternately scanning the first and second coarse sets of wires, and means operative during the scanning of the sets of wires along the first coordinate axis for causing the counter for the second coordinate axis to alter its count by a predetermined amount whereby the succeeding scan along the second coordinate axis commences at the location corresponding to the altered count of the counter.

10. The system according to claim 9 for digitizing the position of a stylus on a coordinate axis, the system further comprising a fine set of parallel wires on the platen, the fine set being more closely spaced along the coordinate axis than the wires of the coarse set, the wires of the fine set constituting groups, the wires of each group being interleaved with the wires of the other groups whereby the wires of the groups occur repetitively in the same successive order along the coordinate axis, pulse means for electrically pulsing all the wires of a group together, the pulse means causing each group to be separately pulsed in its turn, and signal processing means coupled to the output of the stylus, the signal processing means being responsive to the amplitude characteristics of the signals capacitively coupled to the stylus from the groups of wires in the fine set, and the signal processing means providing digital signals representing divisions of the interval between coarse grid lines.

11. The system according to claim 10 wherein the signal processing means comprises sample and hold means responsive to signal amplitude for sampling the output of the stylus concurrently with the pulsing of each group of wires in the fine set and storing the sampled signals, and combining means responsive to the amplitude of the stored sampled signals for providing first and second basic signals, each basic signal varying periodically as the stylus is moved along the coordinate axis, and the basic signals being out of phase whereby the ratio of one basic signal to the other is unvarying for any stationary position of the stylus.

12. The system according to claim 11 wherein the signal processing means further comprises means responsive to the first and second basic signals for providing digital output signals representing the divisions of the interval between coarse grid wires.

13. The system according to claim 12 wherein the platen has second coarse and fine sets of parallel wires spaced along a second coordinate axis, and the system further includes additional scan pulse means for electrically pulsing in sequence wires of the second coarse set, additional pulse means for electrically pulsing the second fine set of wires in groups, a second counter coacting with the additional scan pulse means to cause the count in the second counter to identify the wire being pulsed in the second coarse set, means for alternately scanning the first and second sets of parallel wires to alternately obtain a digitized coordinate for each axis, and means operative during the scanning of the sets of wires along the first coordinate axis for causing the counter for the second coordinate axis to alter its count by a predetermined amount whereby the succeeding scan along the second coordinate axis commences at the location corresponding to the altered count of the counter.

* * * * *